Figure 4:
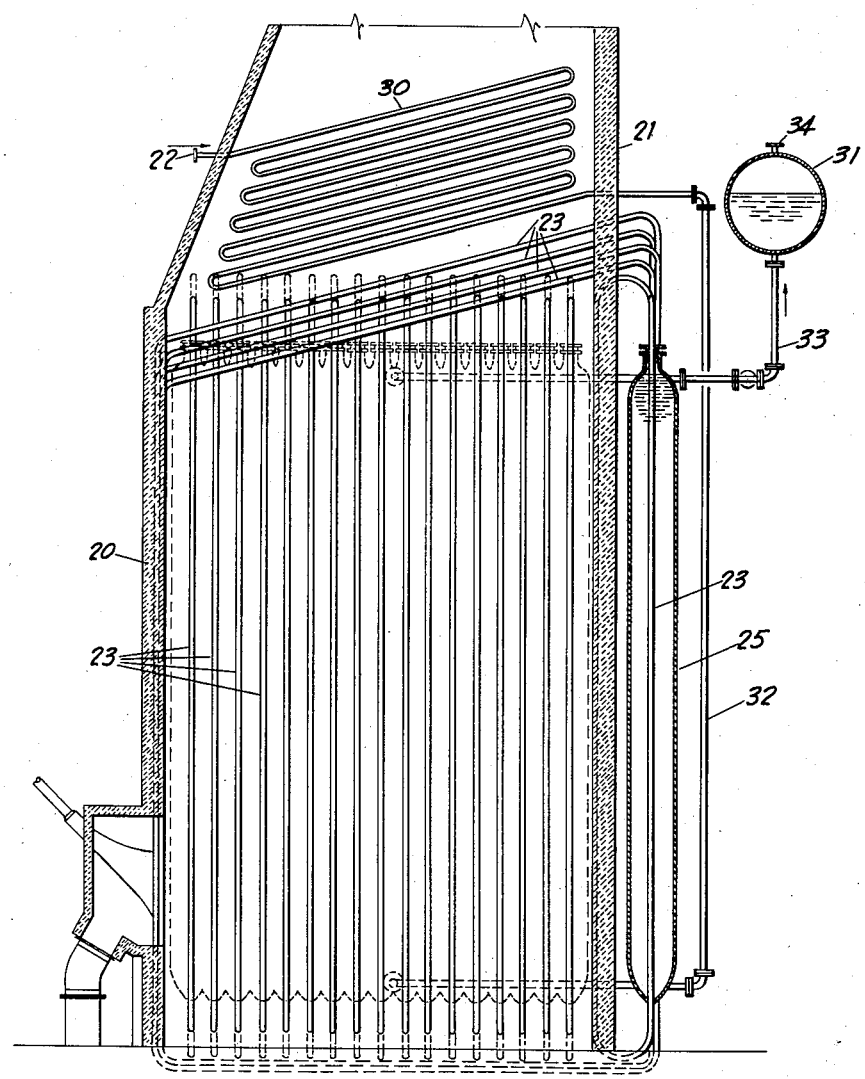

Oct. 9, 1934.    R. C. ROE    1,976,462
BOILER FOR POWER PLANTS
Filed Feb. 21, 1931    2 Sheets-Sheet 1
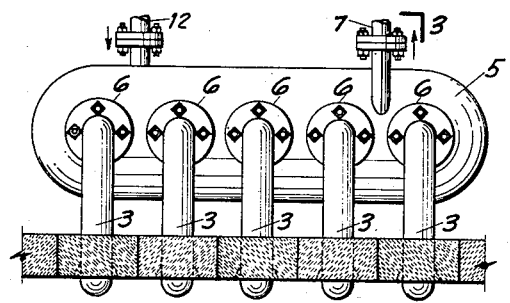
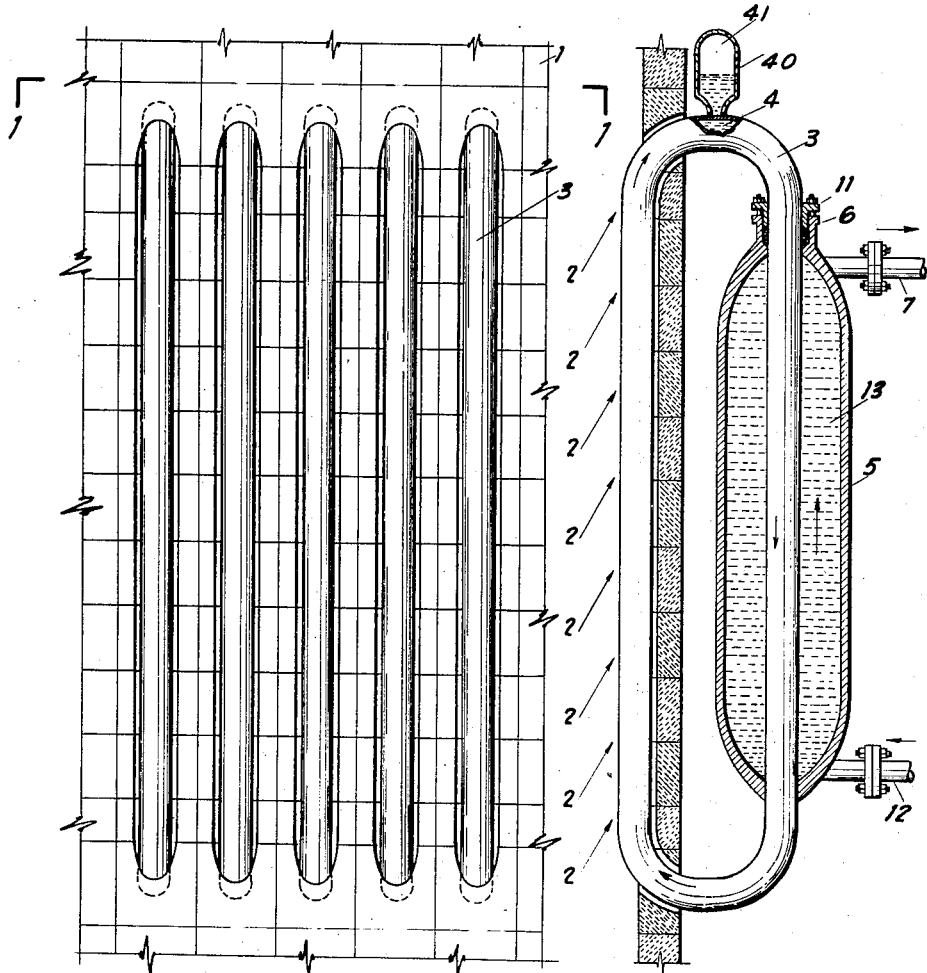

Oct. 9, 1934.   R. C. ROE   1,976,462
BOILER FOR POWER PLANTS
Filed Feb. 21, 1931   2 Sheets—Sheet 2

Ralph C. Roe INVENTOR

Patented Oct. 9, 1934

1,976,462

UNITED STATES PATENT OFFICE 1,976,462

BOILER FOR POWER PLANTS

Ralph C. Roe, Englewood, N. J., assignor of one-half to Stephen W. Borden, Summit, N. J.

Application February 21, 1931, Serial No. 517,550

5 Claims. (Cl. 122—33)

This invention pertains to improvements in apparatus for heating liquids and more particularly to heating liquids indirectly from heat generated by combustion in a furnace and still more particularly to those cases where it is undesirable to subject any part or particle of the liquid to be heated to the temperature obtaining in the furnace.

Amongst the objects of my invention is to provide a boiler suitable for heating and vaporizing diphenyl and other liquids which are subject to decomposition at high temperatures and also to provide a type of furnace wall which is less susceptible to the destructive influences of high temperatures and abrasive forces than is the ordinary furnace wall built of refractory materials. Another object is to provide a liquid cooled furnace wall which is less hazardous than the conventional types.

For the purpose of illustration, the temperatures in the furnaces of modern steam boilers may be of the order of 2700° F. It is desirable, for certain applications, to heat a liquid, such as diphenyl oxide, from the hot gases of the furnace but diphenyl oxide has a tendency to decompose at temperatures about 900° F. The liquid may be passed through a metal tube located in the furnace and circulated rapidly enough so that its average temperature will not be over 900° F. but the layer of liquid next to the tube may reach temperatures considerable in excess of the decomposition point with the result that a certain amount of decomposition will result and this decomposition will be accumulative. My invention is designed to overcome this difficulty.

In the drawings Fig. 1 is a plan view of a part of a furnace wall with one of my heat transfer units therein, the furnace wall being in section. Fig. 2 is a front elevation looking at the furnace wall from the inside of the furnace. Fig. 3 is a side elevation, partly in section, taken on line 3—3 of Fig. 1.

Fig. 4 is a schematic drawing showing in vertical cross section a boiler for heating fluid in containers which are not directly exposed to the flame in the furnace.

Referring to the drawings; 1 is a portion of a furnace wall, the hot gases of the furnace being indicated by 2; 3 is a seamless metal tube; 4 a liquid in the tube; 5 a metal tank; 6 a stuffing box on the tank and 7 pipe connections to the tank. 40 represents an expansion dome containing inert gas 41. In Fig. 4; 20 and 21 are furnace walls; 23 the water tubes exposed to the furnace flame; 25 the container for the liquid to be heated; 30 represents tubes containing the fluid to be heated and 31 a boiler drum for the fluid.

I construct my heat transfer equipment in units consisting of several tubes made up to a single tank. The tubes are seamless, endless tubes built for very high pressure. The stuffing box, 11, at the top of tank 5 is for the purpose of permitting the tube 3 to expand and contract.

The tubes 3 are filled with a liquid which will not decompose at any temperature to which it may be subjected in the furnace, such as mercury or water or other inorganic substance, and in my preferred form, I use pure water. The tube is filled full of water and while it may be heated near the surface to very high temperatures and while its average temperature may be relatively high, nevertheless it is confined in the tube and must remain a liquid although it may exert a pressure of several thousand pounds. The construction, however, is such that tubes which will withstand the pressure which will be generated and which will withstand the abrasive and corrosive effects of the furnace gases, may be easily and relatively cheaply constructed. If mercury is used, the pressure will be lower but an expansion dome should be provided. The dome should be filled with inert gas, the compression of which will allow for the expansion of the mercury.

The tank 5 is filled with the liquid 13 such as diphenyl oxide or such other liquids as it is desired to heat, the liquid entering the tank preferably at 12 and leaving at 7 thus providing a counter flow heat transfer in the tank.

The transfer of heat from gases 2 to the tube 3 being a gas to metal transfer, will be less effective than the transfer from the tube 3 to the liquid 13 this being a metal to liquid transfer. The heated liquid 4, while passing upward through the upper loop and down into the tank 5, becomes mixed sufficiently so that all parts of the liquid are at the same temperature and the unit is so designed that when the liquid 4 enters the tank 5, it will not be in excess of the permissible temperature to which the liquid 13 may be safely subjected. For instance if the liquid be diphenyl oxide, the water 4 will enter the tank 5 at a temperature not in excess of 900° and the liquid 13 may be heated up to somewhere between 800° and 850° or to some lower temperature depending upon the volume and rate of circulation of the liquid through the tank.

Since the circulation in the tube 3 is maintained by the thermo-siphon effect, it is obvious that the tubes must be inclined and of course the nearer they are to being vertical, the better the circulation will be.

The heated liquid 13 may be used for any desired purpose such as heating boiler feed water, reheating steam in a steam turbine, resuperheating steam, process work, etc., the liquid being circulated through the tank 5 and through a heater at such point as it is desired to deliver the heat drawn from the furnace gases.

In Fig. 2 the furnace is equipped with heat transfer water tubes on all four walls, the diphenyl chambers for the tubes in the front wall 20 and the rear wall 21 being located at the rear of the boiler as shown at 25 while those for the two side walls are located along both sides as shown by the dotted outline in the figure.

30 represents the first row of tubes in the boiler which contain the fluid to be heated, these being located in a zone where they will not be in direct contact with the furnace flame and where the gases have a reduced temperature due to previous contact with the water tubes in the walls. The diphenyl or other fluid being heated for outside circulation, passes out through outlet 34 to such exterior point as may be desired and where heat is taken from it, after which it returns and enters through opening 22 to the tubes represented by 30 where it is partially heated. It then flows through conduit 32 into container 25, thence upward through 25, where it is heated to its maximum temperature by the hot tube 23, after which it passes out through conduit 33 into the drum 31 thus completing the circuit. It is to be understood that it may leave drum 31 in the form of vapor, the vapor being condensed to a liquid somewhere in the exterior circuit.

My boiler may be used to advantage in regenerative heat cycles which involve the heating of binary fluids such as described in my co-pending application Serial No. 508,068.

With the boiler of the type herein described, it is possible to utilize any of the commercially available fuels and firing methods inasmuch as any desired furnace temperature may be utilized without regard to the limitations of the fluid to be heated.

The type of furnace wall herein described has substantially all the merits of water cooled furnace walls as the circulating high pressure water keeps the tubes at a temperature where they are little affected by the furnace flame and being of heavy metal, require very little in the way of maintenance.

In the conventional furnace wall, the furnace wall tubes are connected in circuit with the rest of the boiler with the result that failure in one of these tubes is just as serious as the failure of any of the other boiler tubes. Not only is such a failure accompanied by very serious hazards but it entails an immediate shutting down of the boiler and very often the destruction of other boiler tubes and other portions of the boiler structure. The type of construction herein described may be used in connection with a straight water boiler since the fluid to be heated in the external receptacles may be water. In the case of a failure in one of the endless tubes, the only appreciable immediate result would be the loss of the heat transfer capacity represented by the particular unit involved, since the amount of fluid in a single tube could be discharged into the furnace without any serious effect or hazard and without entailing shutting down the boiler until such time as might be convenient.

While I have shown and described one embodiment of my invention in accordance with the patent statutes, it will be understood that my invention is capable of embodiment in a variety of forms of apparatus and that I am not limited to the specific arrangement or structural parts shown and described, but that the scope of invention is to be gauged by the accompanying claims taken in connection with the state of the prior art.

What I claim is:—

1. A device for transferring heat from a hot gas on one side of a furnace wall to a liquid on the opposite side of the furnace wall which includes an endless metal tube filled with a liquid and disposed with two relatively long parallel sides connected by loops at the top and bottom, one of the sides being located in the hot gases on one side of the wall and the other side being located outside the wall and surrounded by the liquid to be heated, the long sides of the tube lying at an angle to the horizontal.

2. A device for transferring heat from a hot gas on one side of a furnace wall to a liquid on the opposite side of the furnace wall which includes an endless metal tube filled with a liquid and disposed with two relatively long parallel sides connected by loops at the top and bottom, one of the sides being located in the hot gases on one side of the wall and the other side being located in a pressure tight enclosure, the enclosure containing the liquid to be heated, the long sides of the tube lying at an angle to the horizontal.

3. A heat transfer device which includes an endless metal tube filled with a fluid and disposed with two relatively long parallel sides connected by loops at the top and bottom, one of the sides being exposed to a furnace flame and the other side being enclosed in a tank filled with a liquid to be heated, the whole being arranged to permit the circulation of the fluid in the tube by thermosiphon action.

4. A furnace wall which includes a multiplicity of closely spaced conduits on the inside face of the wall, each conduit being connected at the top and bottom with a corresponding conduit on the outside of the wall, said outside conduit being arranged in heat exchange relation with a cooling fluid in a container, each inner and outer conduit with their top and bottom connecting conduits forming an independent single loop of conduit of uniform exterior area and cross-section throughout its length, the loop being arranged to promote thermo circulation of a fluid contained in the loop, the fluid in each loop being isolated from the fluid in each other loop.

5. In a liquid heater: the combination of a furnace wall surrounding a flame in a combustion chamber; a multiplicity of endless metal tubes, each tube having two relatively long, straight portions connected together by relatively short portions at their ends, one long portion of each tube being positioned throughout substantially its full length in radiant heat exchange relation with the furnace flame, a multiplicity of said portions being closely spaced along the inside face of the furnace wall, and the other long portion of each tube being positioned outside the furnace wall and having a part of its length in contact with a liquid in a liquid container, the endless tubes containing a fluid and the fluid of each tube being isolated from that of each other tube, the tubes being positioned to promote thermo circulation of the fluid therein; and a liquid container for the liquid to be heated said container being positioned to isolate the liquid from the furnace wall.

RALPH C. ROE.